(12) United States Patent
Bouilly et al.

(10) Patent No.: US 12,442,792 B2
(45) Date of Patent: Oct. 14, 2025

(54) ION-SELECTIVE ELECTRODE

(71) Applicant: HORIBA Advanced Techno, Co., Ltd., Kyoto (JP)

(72) Inventors: Guillaume Jacques Bouilly, Kyoto (JP); Manabu Shibata, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 613 days.

(21) Appl. No.: 17/802,086

(22) PCT Filed: Feb. 26, 2021

(86) PCT No.: PCT/JP2021/007340
§ 371 (c)(1),
(2) Date: Aug. 24, 2022

(87) PCT Pub. No.: WO2021/177161
PCT Pub. Date: Sep. 10, 2021

(65) Prior Publication Data
US 2023/0101790 A1    Mar. 30, 2023

(30) Foreign Application Priority Data

Mar. 3, 2020 (JP) .................. 2020-035764
Sep. 23, 2020 (JP) .................. 2020-158755

(51) Int. Cl.
*G01N 27/622* (2021.01)

(52) U.S. Cl.
CPC ................. *G01N 27/622* (2013.01)

(58) Field of Classification Search
CPC ..... G01N 27/622; G01N 27/333; H01J 49/00; H01J 49/02; H01J 49/022; H01J 49/025;
(Continued)

(56) References Cited

U.S. PATENT DOCUMENTS

2002/0144925 A1* 10/2002 Busch ............... B65D 77/0466
    206/524.2
2010/0082265 A1*  4/2010 Song ...................... C02F 1/008
    250/281
(Continued)

FOREIGN PATENT DOCUMENTS

CA      1207027 A    7/1986
JP    S60171446 A    9/1985
(Continued)

OTHER PUBLICATIONS

Kaempgen et al., Transparent and flexible carbon nanotube/polyaniline pH sensors, Nov. 2, 2005, Journal of Electroanalytical Chemistry, 586, pp. 72-76. (Year: 2005).*
(Continued)

*Primary Examiner* — Jason L Mccormack
(74) *Attorney, Agent, or Firm* — Alleman Hall & Tuttle LLP

(57) ABSTRACT

Provided is an all-solid-state ion-selective electrode capable of further stabilizing a measurement value. The all-solid-state ion-selective electrode includes a working electrode and an ion responsive membrane, the all-solid-state ion-selective electrode includes an ion-electron conversion layer disposed between the working electrode and the ion responsive membrane and electrically connecting the working electrode and the ion responsive membrane to each other, and the ion-electron conversion layer contains an ion-electron conversion substance and a polymer or contains a polymer having an ion-electron conversion function.

10 Claims, 5 Drawing Sheets

(58) Field of Classification Search
CPC .......... H01J 49/06; H01J 49/067; H01J 49/08; H01J 49/26
USPC ...................................... 250/281, 396 R, 398
See application file for complete search history.

(56) References Cited

U.S. PATENT DOCUMENTS

| | | | | |
|---|---|---|---|---|
| 2011/0240929 | A1* | 10/2011 | Yang ...................... | B82Y 30/00 252/511 |
| 2016/0223486 | A1 | 8/2016 | Ishige et al. | |
| 2018/0331367 | A1* | 11/2018 | Kim .................... | H01M 50/417 |
| 2020/0116664 | A1* | 4/2020 | Abeyrathne ......... | G01N 27/301 |

FOREIGN PATENT DOCUMENTS

| | | |
|---|---|---|
| JP | S6453151 A | 3/1989 |
| JP | 2010117269 A | 5/2010 |
| JP | 6127460 B2 | 5/2017 |
| KR | 20000002919 A | 1/2000 |
| KR | 20190083120 A | 7/2019 |
| WO | 2006093422 A1 | 9/2006 |

OTHER PUBLICATIONS

ISA Japan Patent Office, International Search Report Issued in Application No. PCT/JP2021/007340, May 18, 2021, WIPO, 6 pages.

Mousavi, Z. et al., Poly(3, 4-ethylenedioxythiophene) (PEDOT) doped with carbon nanotubes as ion-to-electron transducer in polymer membrane-based potassium ion-selective electrodes, Journal of Electroanalytical Chemistry, vol. 633, No. 1, Jul. 2009, 7 pages.

Miyahara, Y. et al., "Shift and drift of electromotive forces of solid-state electrodes with ion-selective liquid membranes," Analytica Chimica Acta, vol. 331, No. 1-2, Sep. 1996, 11 pages.

Hu, J. et al., "Rational design of all-solid-state ion-selective electrodes and reference electrodes," Trends in Analytical Chemistry, vol. 76, Feb. 2016, 13 pages.

Crespo, G. et al., "Ion-Selective Electrodes Using Carbon Nanotubes as Ion-to-Electron Transducers," Analytical Chemistry, vol. 80, No. 4, Feb. 15, 2008, 7 pages.

Grause, G. et al., "Solubility parameters for determining optimal solvents for separating PVC from PVC-coated PET fibers," Journal of Material Cycles and Waste Management, vol. 19, Dec. 16, 2015, 12 pages.

European Patent Office, Extended European Search Report Issued in Application No. 21765315.3, Dec. 7, 2023, Germany, 9 pages.

China National Intellectual Property Administration, Office Action and Search Report Issued in Application No. 202180016767.1, Jun. 24, 2024, 14 pages.

Umezawa, Y. et al., "Potentiometric Selectivity Coefficients of Ion-Selective Electrodes Part I. Inorganic Cations (Technical Report)," Pure and Applied Chemistry, vol. 72, No. 10, Jan. 1, 2000, 232 pages.

Umezawa, Y. et al., "Potentiometric Selectivity Coefficients of Ion-Selective Electrodes Part II. Inorganic Anions (IUPAC Technical Report)," Pure and Applied Chemistry, vol. 74, No. 6, Jan. 1, 2002, 72 pages.

* cited by examiner ent of the present invention.

ION-SELECTIVE ELECTRODE

TECHNICAL FIELD

The present invention relates to an ion-selective electrode.

BACKGROUND ART

As an all-solid-state ion-selective electrode that does not contain an internal liquid, as described in Non Patent Literature 1, an electrode is proposed in which a layer made of only carbon nanotubes that electrically connect a working electrode made of metal and an ion responsive membrane to each other is provided on the surface of the working electrode, and the ion responsive membrane is laminated on the surface of the carbon nanotube layer on the sample solution side.

CITATION LIST

Non Patent Literature

Non Patent Literature 1: "Ion-Selective Electrodes Using Carbon Nanotubes as Ion-to-Electron Transducers", Gaston A. Crespo et al, Anal. Chem., 80, 1316-1322 (2008)

Non Patent Literature 2: "Solubility parameters for determining optimal solvents for separating PVC from PVC-coated PET fibers" Guido Grause et al., J. Mater. Cycles Waste Manag., 19(2), 612-622 (2017)

SUMMARY OF INVENTION

Technical Problem

However, when an ion concentration is actually measured using the conventional all-solid-state ion-selective electrode, the present inventors have noticed that the measurement value may drift.

As a result of intensive studies on the cause of the drift of the measurement value, the present inventors have considered that the carbon nanotubes mixed in the ion responsive membrane may cause the drift.

In the case of manufacturing the conventional all-solid-state ion-selective electrode, a carbon nanotube layer is formed, and then a material of the ion responsive membrane is suspended in an organic solvent and dropped on the surface of the carbon nanotube layer. At this time, the carbon nanotubes that constitute the carbon nanotube layer are eluted in an organic solvent contained in the material of the ion responsive membrane, and the carbon nanotubes are mixed into the ion responsive membrane. It is considered that when the carbon nanotubes are mixed in the ion responsive membrane as described above, the sample solution and the carbon nanotubes mixed in the ion responsive membrane directly react with each other to cause a drift of the measurement value.

The present invention has been made in view of the above-described problems, and an object of the present invention is to provide an all-solid-state ion-selective electrode capable of inhibiting mixing of an ion-electron conversion substance such as carbon nanotubes into an ion responsive membrane and further stabilizing a measurement value.

Solution to Problem

That is, an all-solid-state ion-selective electrode according to the present invention includes a working electrode and an ion responsive membrane, and includes an ion-electron conversion layer disposed between the working electrode and the ion responsive membrane and electrically connecting the working electrode and the ion responsive membrane to each other, and the ion-electron conversion layer contains an ion-electron conversion substance and a polymer or contains a polymer having an ion-electron conversion function.

With use of such an all-solid-state ion-selective electrode, since a polymer is contained in the ion-electron conversion layer, the ion-electron conversion substance in the ion-electron conversion layer is protected by the polymer and is hardly eluted. As a result, it is possible to inhibit mixing of the ion-electron conversion substance into the ion responsive membrane.

As long as the entire surface of the ion-electron conversion layer on the sample solution side is covered with the ion responsive membrane, another sealing member for preventing the ion-electron conversion substance in the ion-electron conversion layer from directly contacting the sample solution does not have to be provided.

As a specific embodiment of the present invention, the ion-electron conversion substance may contain one or more substances selected from the group consisting of carbon nanotubes, graphene, and graphite.

When the polymer has adhesiveness, the ion-electron conversion layer also serves as an adhesive layer, so that the all-solid-state ion-selective electrode can be manufactured only by laminating the ion-electron conversion layer on the working electrode and laminating the ion responsive membrane on the ion-electron conversion layer.

When a carbon microstructure such as a carbon nanotube, for example, is used as the ion-electron conversion substance, it is considered that the carbon microstructure adsorbs oxygen and the property as the ion-electron conversion substance changes. Accordingly, the polymer preferably has an oxygen permeability of greater than or equal to 0.05 $cc/m^2/day$ and less than or equal to 50,000 $cc/m^2/day$.

Further, when the polymer is oxygen-impermeable, it is not necessary to use a polymer having low oxygen permeability as the polymer used in the ion responsive membrane, and it is possible to expand the choice of materials of the ion responsive membrane.

When the polymer has resistance to a solvent used in manufacture of the ion responsive membrane, it is possible to inhibit dissolution of the ion-electron conversion layer in the solvent. As a result, it is possible to further inhibit elution of the ion-electron conversion substance or the polymer having an ion-electron conversion function from the ion-electron conversion layer.

As a specific embodiment of the present invention, the polymer may be fluoropolysiloxane.

Advantageous Effects of Invention

According to the present invention, it is possible to further stabilize the measurement value of the all-solid-state ion-selective electrode than in conventional ones.

Figure 1:
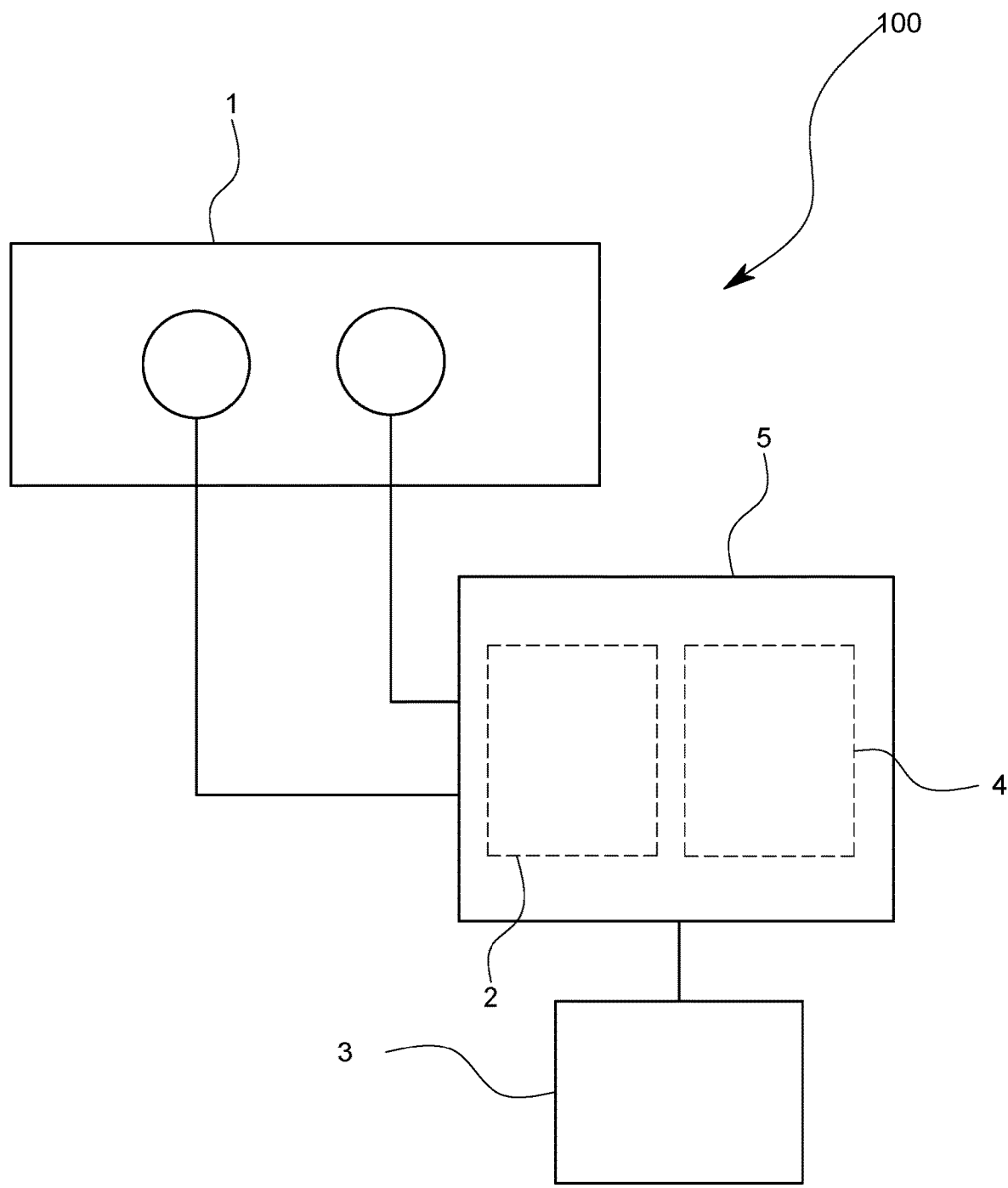
FIG. 1 is a schematic diagram illustrating an entire ion concentration measurement device according one embodiment of the present invention.

LIST OF REFERENCE CHARACTERS 100 ion concentration measurement device
1 sensor unit
121 ion-selective electrode
121a working electrode
121b ion responsive membrane
121c ion-electron conversion layer
122 comparison electrode

DESCRIPTION OF EMBODIMENTS

Hereinafter, one embodiment of the present invention will be described with reference to the drawings.

As illustrated in FIG. 1, an ion concentration measurement device 100 according to the present embodiment includes, for example, a sensor unit 1 that comes into contact with a sample solution and detects ions and the like contained in the sample solution, a calculation unit 2 that calculates an ion concentration and the like on the basis of an output value output from the sensor unit 1, a display unit 3 that displays a measurement value and the like calculated by the calculation unit 2, and a control unit 4 that controls the calculation unit 2 and the display unit 3.

Figure 2:
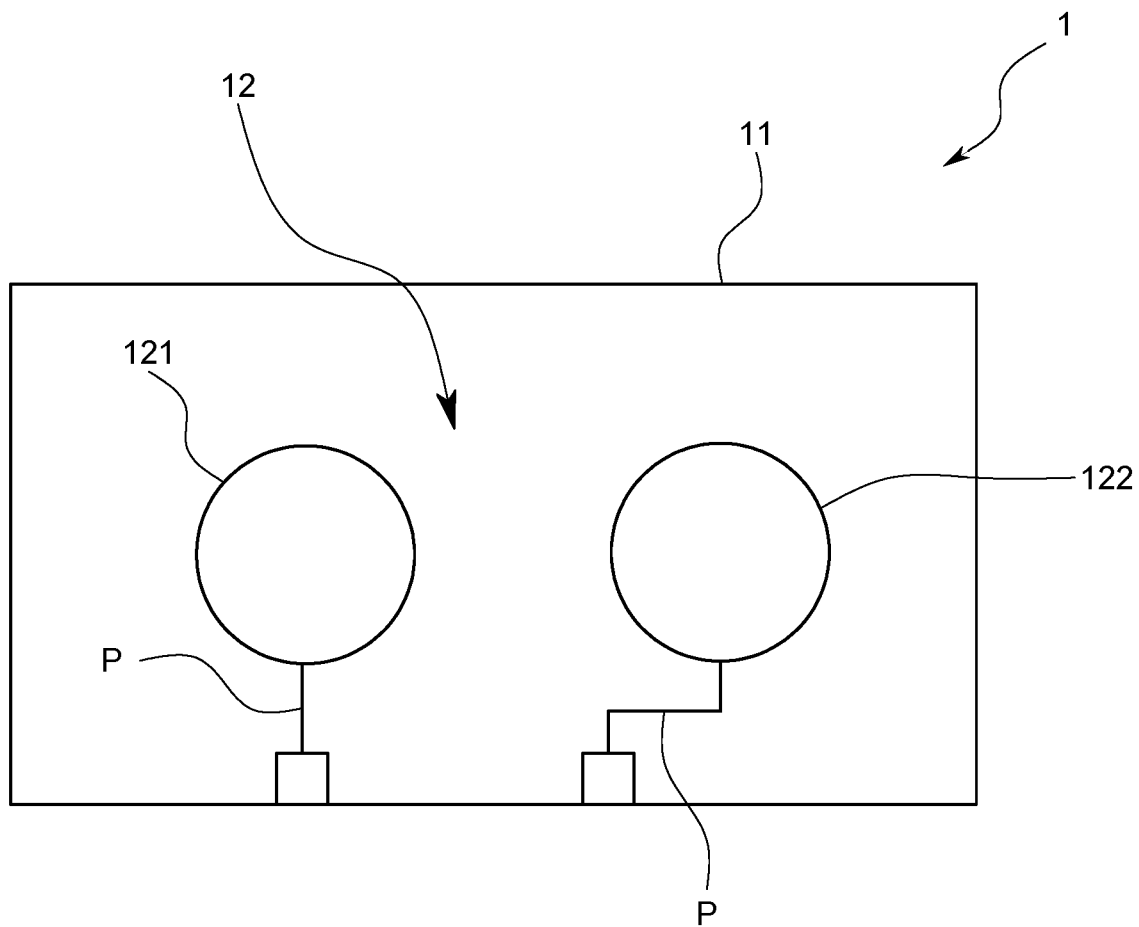
FIG. 2 is a schematic diagram illustrating a sensor unit according one embodiment of the present invention.

As illustrated in FIG. 2, the sensor unit 1 includes, for example, a film-like base material 11 made of a liquid crystal polymer, polyvinyl chloride, polyethylene terephthalate or the like and having a length of 3 cm, a width of 1 cm, and a thickness of about 0.5 mm, an electrode unit 12 provided on the base material 11, and the like.

In this embodiment, an information processing circuit 5 provided separately from the sensor unit 1 acts a role of the calculation unit 2.

The information processing circuit 5 includes a digital circuit made up of a CPU, a memory, a communication port, and the like, an analog circuit including a buffer, an amplifier, and the like, and an AD converter, a DA converter, and the like that mediate the digital circuit and the analog circuit. Then, the CPU and its peripheral devices cooperate in accordance with a predetermined program stored in the memory, so that the information processing circuit 5 functions as the calculation unit 2.

Hereinafter, the electrode unit 12 will be described in detail.

As illustrated in FIG. 2, the electrode unit 12 includes, for example, an ion-selective electrode 121 and a comparison electrode 122, each of which is connected to the information processing circuit 5 by a printed wire P formed on the base material 11.

In this embodiment, the ion-selective electrode 121 is, for example, a sodium ion-selective electrode that measures the sodium ion concentration of the sample solution.

Figure 3A:
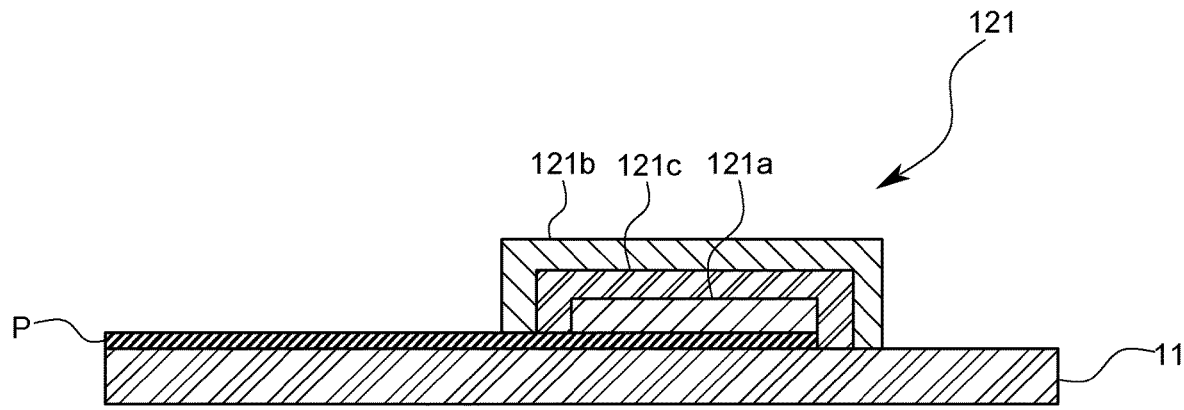
FIGS. 3(a) and 3(b) are schematic diagrams illustrating a cross section of an ion-selective electrode and a comparison electrode according to the present embodiment.

The ion-selective electrode 121 is of an all-solid-state type, and as illustrated in FIG. 3(a), includes a flat-plate-like working electrode 121a disposed on the base material 11 so as to be electrically connected to the printed wire P, an ion responsive membrane 121b formed so as to cover the working electrode 121a, and an ion-electron conversion layer 121c disposed between the working electrode 121a and the ion responsive membrane 121b.

The working electrode 121a is a metal such as silver, platinum, or the like.

The ion responsive membrane 121b is formed so as to cover the ion-electron conversion layer 121c, and contains an ion responsive substance and a polymer (polymer for the ion responsive membrane).

In the present embodiment, as one example, the ion responsive membrane 121b containing 4-tert-Butylcalix[4]arene-tetraacetic acid tetraethyl ester as the ion responsive substance and polyvinyl chloride (hereinafter also referred to as PVC) as the polymer for the ion responsive membrane will be described.

The ion responsive membrane 121b is formed by applying a solution, which is obtained by dissolving the ion responsive substance and the polymer for the ion responsive membrane in an appropriate solvent (solvent for the ion responsive membrane), onto the ion-electron conversion layer 121c and drying and curing the solution. In the present embodiment, as one example of the solvent for the ion responsive membrane, tetrahydrofuran, which is an organic solvent that easily dissolves PVC used as the polymer for the ion responsive membrane, is used.

Whether the solvent easily dissolves a certain polymer or not is defined in the description using the following Math. 1, for example.

$$Q = \frac{m1/p1 + (m2 - m1)/p2}{m1/p1} \quad [\text{Math. 1}]$$

(In Math. 1, m1 represents the mass of a test piece before a test, m2 represents the mass of the test piece after the test, p1 represents the density of the polymer in the test piece, and p2 represents the density of the solvent.)

Q is calculated from a mass change of the test piece when 0.2 g of the test piece is immersed in 5 ml of a solvent at 20° C. for 30 minutes.

Regarding whether the solvent easily dissolves the polymer or not, when the value of Q is greater than or equal to 2, it is determined that the solvent easily dissolves the polymer, and when the value of Q is greater than or equal to 10, it is determined that the solvent very easily dissolves the polymer.

Accordingly, as the solvent for the ion responsive membrane, it is preferable to use a solvent whose value of Q calculated using a test piece made of PVC is greater than or equal to 2, and it is more preferable to use a solvent whose value of Q is greater than or equal to 10.

Regarding PVC, examples of the solvent whose value of Q is greater than or equal to 10 include tetrahydrofuran, cyclohexanone, cyclopentanone, dimethylacetamide (DMA), pyridine, 3-pentanone, 2-pentanone, dimethylformamide (DMF), and methyl ethyl ketone (MEK).

Regarding PVC, examples of the solvent whose value of Q is greater than or equal to 2 include dichloromethane, 4-methylpenta-2-one, nitrobenzene, 1,4-dioxane, 1,1,2,2-tetrachloroethane, acetone, ethyl acetate, and chloroform.

Figure 3B:
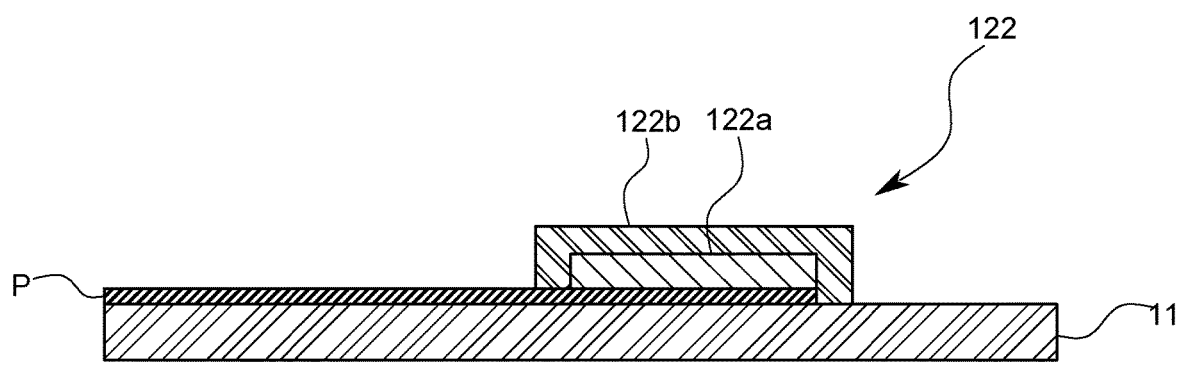

The comparison electrode 122 functions as a reference electrode to the ion-selective electrode 121, and as illustrated in FIG. 3(b), the comparison electrode 122 includes a flat-plate-like comparator electrode 122a disposed on the base material 11 so as to be electrically connected to the printed wire P, and a salt bridge layer 122b attached so as to cover the comparator electrode 122a.

The comparator electrode 122a is, for example, preferably a metal which is hardly oxidized, and specific examples thereof include a silver/silver chloride electrode, a silver electrode, and a carbon electrode.

The salt bridge layer 122b electrically connects the comparator electrode 122a and the sample solution to each other, and is a gel-like internal liquid, for example.

Thus, the ion-electron conversion layer 121c contains an ion-electron conversion substance and a polymer (polymer for an ion-electron conversion layer), for example.

As the ion-electron conversion substance, a carbon microstructure can be used, for example.

As the carbon microstructure, for example, a carbon microstructure containing one or more selected from carbon nanotubes, carbon nanofibers, carbon nanowalls, fullerenes, graphite, and graphene can be used. In the present embodiment, carbon nanotubes are used as one example of the ion-electron conversion substance.

The content of the carbon microstructure in the ion-electron conversion layer 121c is preferably greater than or equal to 0.001 mass% and less than or equal to 12.0 mass%, more preferably greater than or equal to 0.001 mass% and less than or equal to 0.02 mass%, and still more preferably greater than or equal to 0.003 mass% and less than or equal to 0.01 mass%.

The polymer for the ion-electron conversion substance is not particularly limited, and may be a natural resin or a synthetic resin, for example.

The natural resin may be any of a plant-derived natural resin, an animal-derived natural resin, and a mineral-derived natural resin.

As the synthetic resin, a resin containing one or more kinds selected from polyvinyl chloride (PVC), polystyrene, polyvinyl butyral, a polyamide-based resin, a polyimide-based resin, a polyurethane-based resin, PTFE, a silicone-based resin, a polyvinylidene fluoride-hexafluoropropylene copolymer, an acrylic resin, an epoxy resin, polyolefin, and raw rubber can be widely used, for example. Examples of the silicone-based resin include fluoropolysiloxane, polydimethylsiloxane, and polysiloxane. Examples of the acrylic resin include polyacrylate, polymethacrylate, and polybutyl acrylate. Examples of the polyamide resin include polyamide, aliphatic polyamide, and polyphthalamide. Examples of the polyimide-based resin include aliphatic polyimide and aromatic polyimide. Examples of the polyurethane-based resin include glycol-based polyurethane and amine-based polyurethane.

As the polymer for the ion-electron conversion layer, a polymer having an oxygen permeability in a range of greater than or equal to 0.05 cc/m$^2$/day and less than or equal to 50,000 cc/m$^2$/day is preferably used so that the ion-electron conversion substance in the ion-electron conversion layer 121c does not react with oxygen. The oxygen permeability of the polymer for the ion-electron conversion layer is more preferably greater than or equal to 0.05 cc/m$^2$/day and less than or equal to 10,000 cc/m$^2$/day, still more preferably greater than or equal to 0.05 cc/m$^2$/day and less than or equal to 5,000 cc/m$^2$/day.

Further, when the polymer for the ion-electron conversion layer has adhesiveness, the ion-electron conversion layer 121c can be used as an adhesive layer, which is preferable because there is no need to separately prepare a sealing member or the like that presses from the outside and seals the working electrode 121a, the ion-electron conversion layer 121c, and the ion responsive membrane 121b. Examples of such polymer having adhesiveness include fluoropolysiloxane and polyvinyl alcohol.

From the viewpoint of inhibiting the elution of the carbon microstructure into the ion responsive membrane 121b, the polymer for the ion-electron conversion layer preferably has solvent resistance so that the ion-electron conversion layer is hardly dissolved in the solvent for the ion responsive membrane after curing. Since there is a possibility that an organic solvent is used as the solvent for the ion responsive membrane, the polymer for the ion-electron conversion layer preferably has organic solvent resistance.

For example, when PVC is used as the polymer for the ion responsive membrane, it is conceivable to use solvents as listed herein, which have a value of Q greater than or equal to 2. Therefore, as the polymer for the ion-electron conversion layer, it is preferable to use a polymer that is hardly soluble in the solvents listed herein, for example, a polymer whose value of Q is less than 2.

For example, when THF is used as the solvent for the ion responsive membrane, it is preferable to use polyvinyl alcohol that is hardly soluble in the solvent for the ion responsive membrane as the polymer for the ion-electron conversion layer.

In the present example, fluoropolysiloxane is used as one example of the polymer for the ion-electron conversion layer having appropriate properties from all of the various viewpoints as described above.

The content of the polymer in the ion-electron conversion layer 121c is preferably greater than or equal to 90 mass% and less than or equal to 99 mass%, and more preferably greater than or equal to 95 mass% and less than or equal to 99 mass%, for example.

The method for manufacturing the ion-selective electrode 121 and the sensor unit 1 according to the present embodiment is as follows.

The working electrode 121a is disposed so as to be electrically connected to the printed wire P printed on the base material 11.

Next, the polymer for the ion-electron conversion layer is dissolved in the solvent for an ion-electron conversion layer to prepare a coating solution in which the carbon microstructure is suspended. The coating solution is applied so as to cover the entire surface of the working electrode 121a on the sample solution side, and dried and cured to form the ion-electron conversion layer 121c.

At this time, the solvent for the ion-electron conversion layer may be completely volatilized, or a part thereof may remain in the ion-electron conversion layer 121c to such an extent that the function of the ion-electron conversion layer 121c is not impaired. The content of the carbon microstructure and the polymer for the ion-electron conversion layer described above is the content in the ion-electron conversion layer 121c after being cured.

After the ion-electron conversion layer 121c is completely cured, the coating solution for the ion responsive membrane as described above is applied so as to cover the entire surface of the ion-electron conversion layer 121c on the sample solution side, and dried and cured to form the ion responsive membrane 121b.

In the present embodiment, since fluoropolysiloxane is used as the polymer for the ion-electron conversion layer, the ion-electron conversion layer 121c itself has adhesiveness. Accordingly, the ion-electron conversion layer 121c serves as an adhesive, and the working electrode 121a is fixed to the base material 11. The ion responsive membrane 121*b* is also fixed to the ion-electron conversion layer 121*c* by the adhesiveness of the ion-electron conversion layer 121*c*.

Next, for example, the comparator electrode 122*a* is disposed so as to be in electrical contact with the printed wire P printed on the base material 11, and the salt bridge layer 122*b* is attached to the base material 11 so as to cover the entire comparator electrode 122*a*. In this embodiment, since the salt bridge layer 122*b* itself has adhesiveness, the comparison electrode 122 can be easily configured by attaching the salt bridge layer 122*b* in this manner.

With use of the ion-selective electrode 121 and the sensor unit 1 configured as described above, since the polymer for the ion-electron conversion layer is contained in the ion-electron conversion layer 121*c*, the ion-electron conversion substance in the ion-electron conversion layer 121*c* is protected by the polymer for the ion-electron conversion layer and is hardly eluted. As a result, it is possible to inhibit mixing of the ion-electron conversion substance into the ion responsive membrane 121*b*.

Further, since tetrahydrofuran is used as the solvent for the ion responsive membrane and fluoropolysiloxane is used as the polymer for the ion-electron conversion layer, even when a coating agent for the ion responsive membrane containing tetrahydrofuran is applied after the ion-electron conversion layer 121*c* is cured, the fluoropolysiloxane is hardly dissolved. As a result, it is possible to further inhibit elution of the ion-electron conversion substance from the ion-electron conversion layer 121*c* and mixing of the ion-electron conversion substance into the ion responsive membrane 121*b*.

The present invention is not limited to the above embodiments.

For example, in the embodiments, the example in which the ion responsive membrane is a Na+ responsive membrane containing (4-tert-Butylcalix[4]arene-tetraacetic acid tetraethyl ester) as an ion responsive substance is described, but for example, other ion responsive substances such as valinomycin and a neutral carrier may be used as the ion responsive substance, and various types of ion responsive membranes that respond to other ions such as potassium ions and calcium ions as well as sodium ions may be used. The ion responsive membrane is preferably of a polymer type containing a polymer.

As the polymer for the ion responsive membrane, in addition to the above-described PVC, for example, polystyrene, acrylate, methacrylate, polyvinyl butyral, polyamide, polyimide, polyurethane, polytetrafluoroethylene (PTFE), polysiloxane, and a copolymer of vinylidene fluoride and hexafluoropropylene (PVDH-HFP) can be used, but the polymer for the ion responsive membrane is not limited thereto.

The polymer for the ion-electron conversion layer is not limited to those described above, and it is preferable to appropriately change the polymer for the ion-electron conversion layer according to the type of the solvent for the ion responsive membrane used at the time of preparing the ion responsive membrane.

In the embodiments, since the ion-electron conversion layer functions as an adhesive, a sealing member for fixing and sealing the working electrode, the ion-electron conversion layer, and the ion responsive membrane to the substrate is not separately provided. However, when the ion-electron conversion layer does not have adhesiveness, a sealing member for fixing and sealing the working electrode, the ion-electron conversion layer, and the ion responsive membrane to the substrate may be separately provided.

Further, even when the ion-electron conversion layer have adhesiveness, the sealing member may be provided in order to further reduce the possibility that the sample solution and the working electrode or the ion-electron conversion layer come into direct contact with each other and the measurement value fluctuates.

The comparison electrode is not limited to an electrode including the salt bridge layer as described above.

In this case, it is possible to provide a differential ion concentration measurement device in which the comparator electrode comes into direct contact with the sample solution without interposing the salt bridge layer. With such an ion concentration measurement device, since the comparison electrode does not include the salt bridge layer, the sensor unit can be further downsized.

Figure 5:
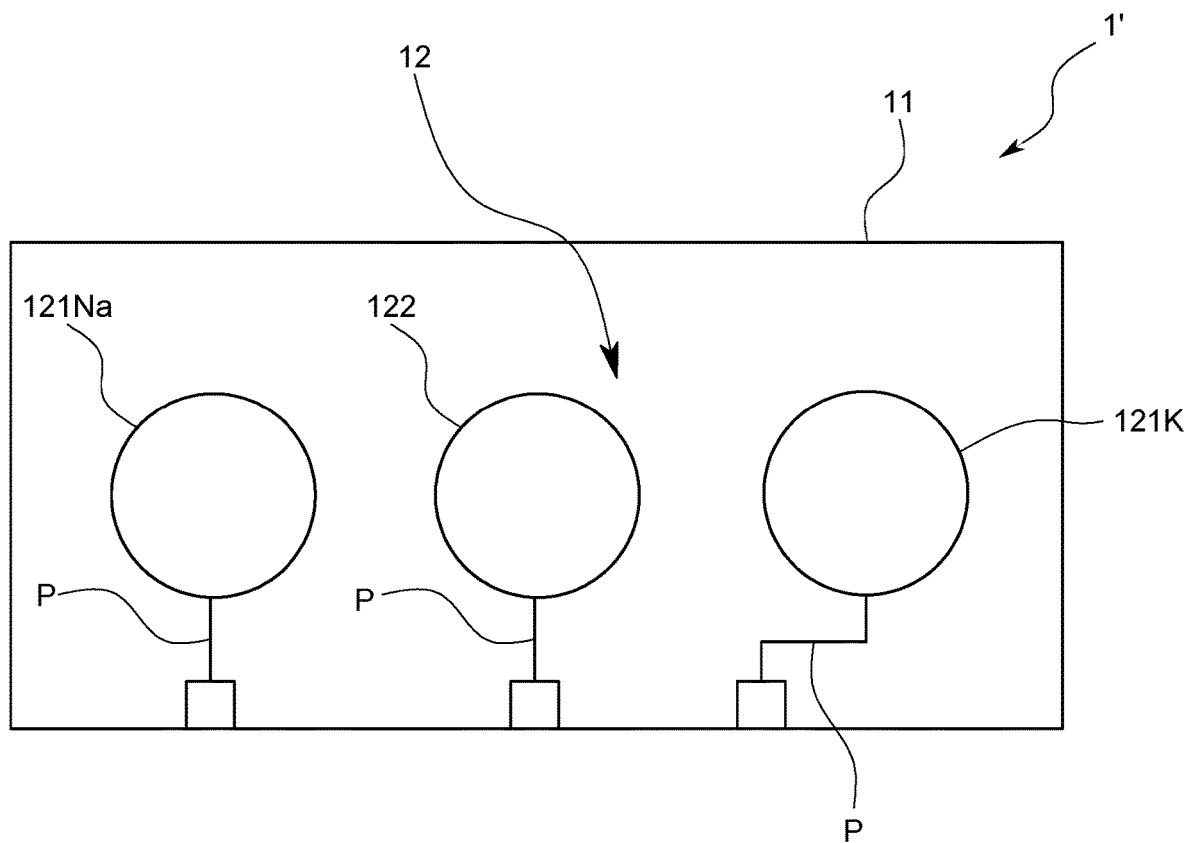
FIG. 5 is a schematic diagram illustrating a sensor unit of an ion concentration measurement device according another embodiment of the present invention.

In such a differential ion concentration measurement device, the potential of the comparator electrode is not constant and may fluctuate. However, as illustrated in FIG. 5, when a sodium ion-selective electrode 121Na and a potassium ion-selective electrode 121K are provided as the ion-selective electrode 121, the concentration ratio between sodium ions and potassium ions can be directly determined by measuring the potential difference between each of the ion-selective electrodes 121Na and 121K and the comparison electrode 122 without determining the concentration of each ion type.

The concentration ratio between sodium ions and potassium ions can be determined by the differential ion concentration measurement device as follows, for example.

First, an appropriate amount of sample solution is dropped so that the responsive membranes of the sodium ion-selective electrode 121Na and the potassium ion-selective electrode 121K and a comparator electrode of the comparison electrode 122 come into contact with the sample solution.

Then, electromotive force corresponding to the concentration of each ion type is generated in the responsive membrane of the sodium ion-selective electrode 121Na and the responsive membrane of the potassium ion-selective electrode 121K.

The electromotive force is detected as a potential difference (voltage) between the working electrode of the sodium ion-selective electrode 121Na or the working electrode of the potassium ion-selective electrode 121K and the comparator electrode of the comparison electrode 122. Next, the concentration ratio between sodium ions and potassium ions can be determined using these potential differences.

A method for practically calculating the concentration ratio between sodium ions and potassium ions in the sample solution is as follows. The potential difference between the sodium ion-selective electrode 121Na or the potassium ion-selective electrode 121K and the comparison electrode 122 in a standard solution having a known concentration ratio of sodium ions to potassium ions is determined, and then the potential difference between the sodium ion-selective electrode 121Na or the potassium ion-selective electrode 121K and the comparison electrode 122 in the sample solution is determined. The concentration ratio of sodium ions to potassium ions in the sample can be calculated using the concentration ratio of sodium ions to potassium ions in the standard solution, the potential differences in the standard solution, and the potential differences in the sample.

In the above-described embodiments, an example in which the ion-electron conversion layer contains an ion-electron conversion substance and a polymer for an ion-electron conversion layer is described, but the present invention is not limited thereto, and the ion-electron conversion layer may be formed of a conductive polymer having an ion-electron conversion function, for example.

Specific examples of the conductive polymer include poly(3,4-ethylenedioxythiophene) (PEDOT), poly(p-phenylene sulfide) (PSS), poly(thiophene)s (PT), polyanilines (PANT), and polypyrrole (PPY). Any one of these conductive polymers may be used alone, or the plurality of conductive polymers may be appropriately mixed and used, such as a mixture of PEDOT and PSS (PEDOT:PSS=1:2).

Furthermore, the ion-electron conversion layer may contain the conductive polymer and the ion-electron conversion substance.

Various modifications and combinations of embodiments may be made without departing from the spirit of the present invention.

EXAMPLES

In the example of the present invention, the sodium ion concentration was measured by using the sensor unit described in the embodiment. Further, as a comparative examples, the sodium ion concentration was measured using exactly the same sensor unit as in the example except that no polymer was contained in the ion-electron conversion layer, and the results in the example and the comparative examples were compared and examined.

A specific experimental method is as follows.

Figure 4:
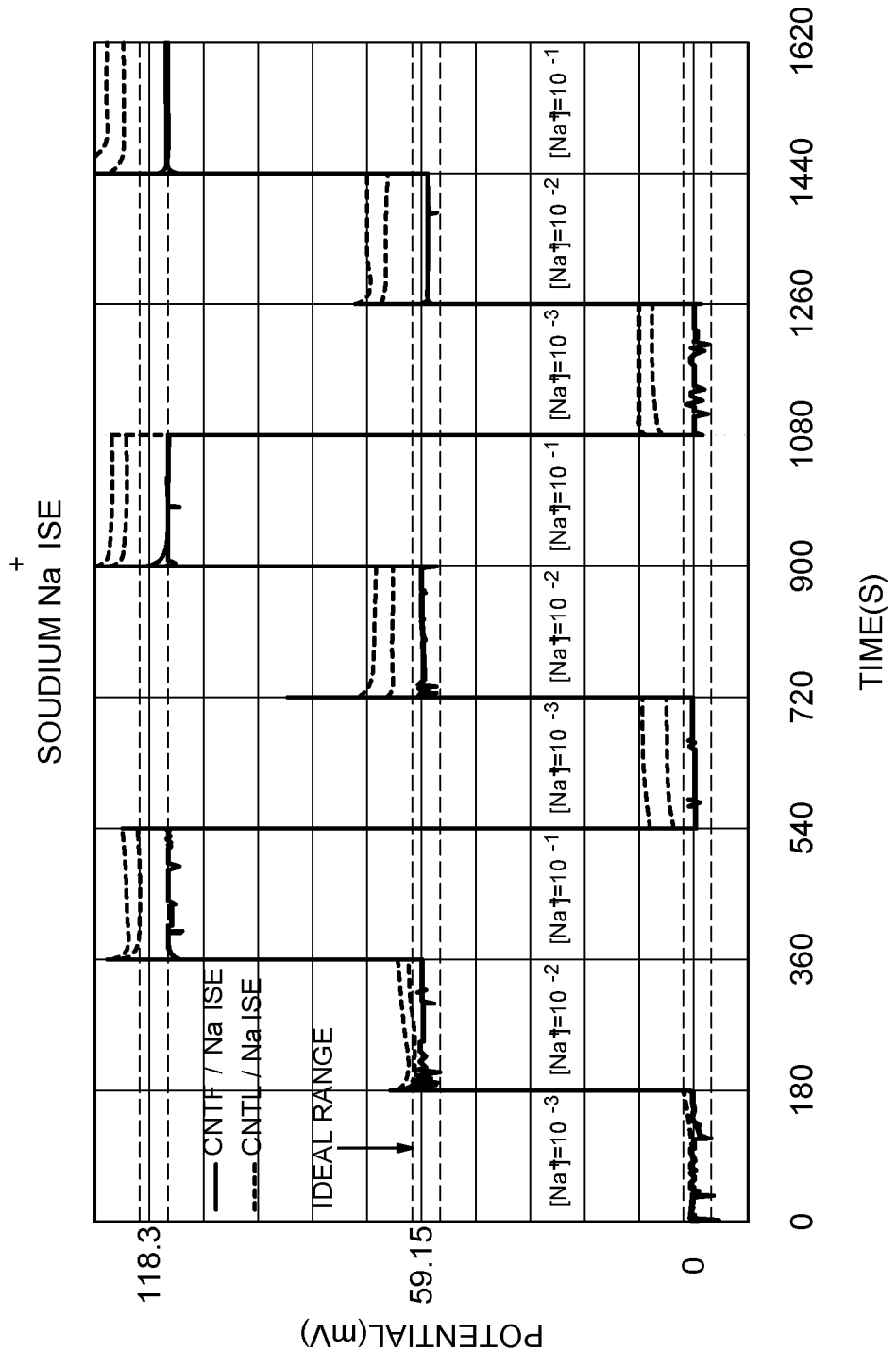
FIG. 4 is a graph illustrating sodium ion measurement results obtained by using ion-selective electrodes according to the examples of the present invention and the comparative example.

The sensor unit was immersed in a sample having a different sodium ion content every 180 seconds, and a temporal potential change was measured. The results are illustrated in FIG. 4. Experiments were performed three times in duplicate for each of the example and the comparative example.

In the comparative example indicated by the dashed line, it can be seen that the value fluctuates every time the sodium ion concentration of the sample is changed. Further, when comparing the results of duplicate experiments using the same sensor unit, it can be seen that the measurement values at each time are different and the reproducibility is also low.

In contrast, in the example indicated by the solid line, the fluctuation of the measurement value is clearly less than that of the comparative example indicated by the broken line, and the duplicate measurement results are almost overlapped. Further, it can be seen that even when the sample concentration is changed many times, almost the same measurement value is obtained every time in the case of the sample having the same concentration.

From these results, it was found that the drift of the measurement value can be reduced and the reproducibility can also be improved by adding a polymer to the ion-electron conversion layer.

INDUSTRIAL APPLICABILITY

It is possible to provide an all-solid-state ion-selective electrode capable of further stabilizing the measurement value.

The invention claimed is:

1. An all-solid-state ion-selective electrode including a working electrode and an ion responsive membrane, the all-solid-state ion-selective electrode comprising:
an ion-electron conversion layer disposed between the working electrode and the ion responsive membrane and electrically connecting the working electrode and the ion responsive membrane to each other,
wherein the ion-electron conversion layer contains an ion-electron conversion substance and a polymer or contains a polymer having an ion-electron conversion function, and
wherein the polymer has resistance to a solvent used in manufacturing the ion responsive membrane.

2. The all-solid-state ion-selective electrode according to claim 1, wherein an entire surface of the ion-electron conversion layer on a sample solution side is covered with the ion responsive membrane.

3. The all-solid-state ion-selective electrode according to claim 1, wherein the ion-electron conversion substance contains one or more selected from the group consisting of carbon nanotubes, graphene, and graphite.

4. The all-solid-state ion-selective electrode according to claim 1, wherein the polymer has adhesiveness.

5. The all-solid-state ion-selective electrode according to claim 1, wherein the polymer has an oxygen permeability of greater than or equal to 0.05 cc/m$^2$/day and less than or equal to 50,000 cc/m$^2$/day.

6. The all-solid-state ion-selective electrode according to claim 1, wherein the polymer is fluoropolysiloxane.

7. An ion concentration measurement device comprising:
the all-solid-state ion-selective electrode according to claim 1; and
a comparison electrode.

8. The ion concentration measurement device according to claim 7,
wherein the all-solid-state ion-selective electrode is a sodium ion-selective electrode and a potassium ion-selective electrode,
the comparison electrode is commonly used for both the sodium ion-selective electrode and the potassium ion-selective electrode, and
the comparison electrode includes no salt bridge layer.

9. A method for manufacturing an all-solid-state ion-selective electrode including a working electrode and an ion responsive membrane, the method comprising the step of:
forming an ion-electron conversion layer on a surface of the working electrode, the ion-electron conversion layer electrically connecting the working electrode and the ion responsive membrane to each other,
wherein the ion-electron conversion layer contains an ion-electron conversion substance and a polymer or contains a polymer having an ion-electron conversion function, and
wherein the polymer contained in the ion-electron conversion layer has resistance to a solvent used in forming the ion responsive membrane.

10. The method for manufacturing an all-solid-state ion-selective electrode according to claim 9, the method comprising the step of:
forming the ion responsive membrane on a surface of the ion-electron conversion layer on a sample solution side.

* * * * *